United States Patent [19]

Acampora et al.

[11] Patent Number: 4,888,640
[45] Date of Patent: Dec. 19, 1989

[54] REFRESH SYSTEM FOR DIGITAL SIGNALS

[75] Inventors: Alfonse A. Acampora, Staten Island, N.Y.; Richard M. Bunting, Robbinsville, N.J.

[73] Assignee: General Electric Company, Schenectady, N.Y.

[21] Appl. No.: 194,656

[22] Filed: May 16, 1988

[51] Int. Cl.⁴ ............................................. H04N 7/37
[52] U.S. Cl. .................................. 358/133; 358/136; 375/27
[58] Field of Search ....................... 358/133, 135, 136; 375/27

[56] References Cited

U.S. PATENT DOCUMENTS

| | | | |
|---|---|---|---|
| 3,962,535 | 6/1976 | Haskell | 358/136 |
| 4,133,006 | 1/1979 | Iinuma | 358/136 |
| 4,144,543 | 3/1979 | Koga | 358/136 |
| 4,179,710 | 12/1979 | Ishiguro et al. | 358/135 |
| 4,202,011 | 5/1980 | Koga | 358/136 |
| 4,232,338 | 11/1980 | Netravali et al. | 358/136 |
| 4,278,996 | 7/1981 | Netravali et al. | 358/136 |
| 4,369,464 | 1/1983 | Temime | 358/136 |
| 4,420,771 | 12/1983 | Pirsch | 358/133 |
| 4,437,119 | 3/1984 | Matsumoto et al. | 358/136 |
| 4,558,361 | 12/1985 | Catros | 358/136 |
| 4,573,167 | 2/1986 | Hentschke et al. | 358/135 |
| 4,591,908 | 5/1986 | Hirano | 358/136 |
| 4,603,347 | 7/1986 | Kuroda et al. | 358/13 |
| 4,672,441 | 6/1987 | Hoelzlwimmer et al. | 358/136 |
| 4,679,081 | 7/1987 | Tsugane et al. | 358/136 |
| 4,706,260 | 11/1987 | Fedele | 358/133 |
| 4,774,496 | 9/1988 | Tomasevich | 375/27 |

OTHER PUBLICATIONS

"Power Reduction Techniques in Megabit DRAM's" Katsutaka Kimura et al., IEEE Journal of Solid-State Circuits, vol. SC-21, No. 3 Jun. 1986, pp. 381–389.
Published Japanese Application 60-224710 Video Memory.
"1985 Memory Products Data Book" Jan. 1985, NEC Electronics Inc., Stock No. 600100.
"1-Mbit Virtually Static RAM" Katzutaka Nogami et al., IEEE Journal of Solid-State Circuits, vol. SC-21, No. 5, Oct. 1986.

Primary Examiner—Howard W. Britton
Attorney, Agent, or Firm—William Squire; James C. Davis, Jr.; Paul R. Webb, II

[57] ABSTRACT

In a DPCM video digital data communication system each scan line of a video frame is refreshed with PCM data over a refresh cycle comprising a plurality of frames. Refresh generators at the transmitter and at the receiver are synchronized with an initialization signal and then run asynchronously to select scan lines for refresh. The refresh generators each employ counters for counting a selected number M, which has no factors in common with the number of scan lines of a frame, to select scan lines for refresh which have respectively different spatial positions in adjacent frames to avoid generating visible refresh artifacts. The number of frames in a refresh cycle is adaptively changed to stabilize the fill of the transmitter rate buffer.

22 Claims, 3 Drawing Sheets

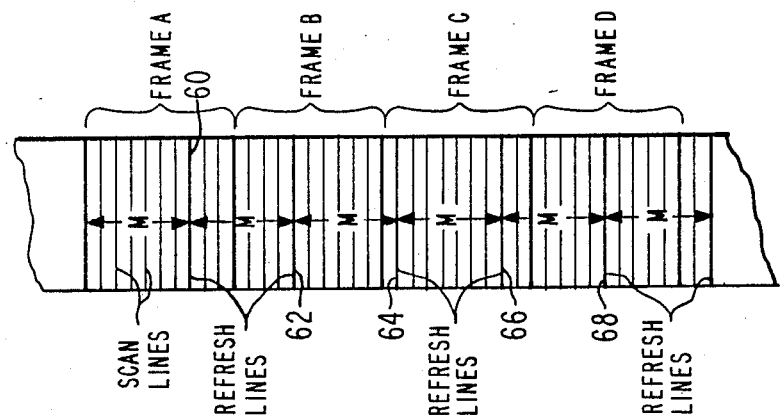
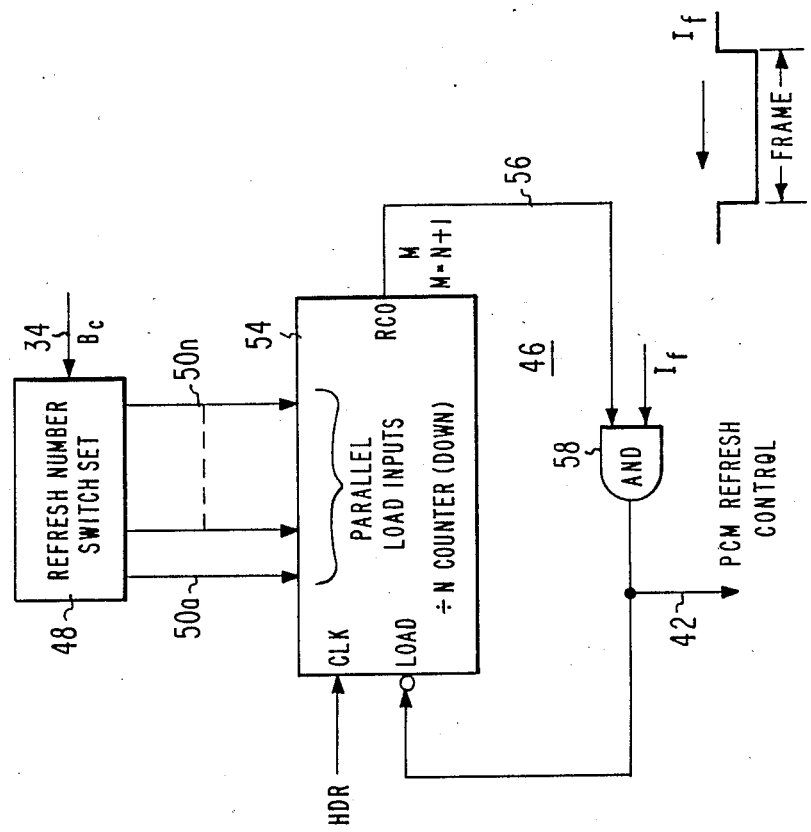

REFRESH SYSTEM FOR DIGITAL SIGNALS

This invention relates to a system for refreshing periodically selected portions of a digital signal and in particular, a video signal transmitted in a communication system.

U.S. Pat. No. 4,706,260 entitled "A DPCM System with Rate-of-Fill Control of Buffer Occupancy" in the name of Fedele et al. and assigned to RCA Corporation is incorporated by reference herein. Of interest are copending applications Ser. No. 63,040 filed June 17, 1987 entitled "Parameterized Variable-length Coding" in the name of B. Astle and S.J. Golin assigned to RCA Corporation, Ser. No. 127,335 filed 12/1/87 entitled "DPCM System with Adaptive Quantizer Having Unchanging Bin Number Ensemble" in the name of A. A. Acampora, Ser. No. 130,379 filed 12/8/87 entitled "Modified Statistical Encoder" in the name of N. J. Fedele, Ser. No. 158,171 entitled "Decoder for Digital Signal Codes" filed Feb. 19, 1988 in the name of Hingorani et al., Ser. No. 194,671 entitled "Refresh System For Digital Signals With Refresh Cycle Synchronization" in the name of Fedele et al. and Ser. No. 194,657 entitled "Error Detector for Encoded Digital Signals" in the name of N. J. Fedele, both filed concurrently herewith, all of the above being assigned to General Electric Company, Ser. No. 008,695 filed 1/30/87 entitled "Block Oriented Random Access Memory Able to Perform a Data Read, a Data Write and a Data Refresh Operation in One Block-access Time" in the name of T. J. Christopher assigned to GE/RCA Licensing Management Operation and Ser. No. 121,025 filed 11/16/87 entitled "Memory Controller As For a Video Signal Processor" in the name of D. L. Sprague et al. assigned to Technology, Inc. 64, the latter two each being a subsidiary of General Electric Co.

In certain cases where the bandwidth available in a transmission channel is limited, it is desirable to compress to as large an extent as possible video data to be transmitted. Numerous schemes have evolved for increasing the efficiency of such compression during transmission while not introducing too intrusive reduction in image quality. For example, one kind of system known as differential pulse code modulation (DPCM) employs a predictive scheme for predicting pixel values of a video picture. The predicted information is compared to the actual information based on spatial or temporal relationships, and an error signal is generated representing the differences between the two information signals.

The error signals are further reduced in information content by more coarsely quantizing them - that is, reducing a set of signal values to a smaller set by assigning a given bin value to a range of values of the larger set. The coarsely quantized information is then encoded using codewords of variable bit length based on statistical parameters. This procedure is known as statistical coding.

Huffman has described procedures for describing variable length codes optimally. Further improvements in coding efficiency can be obtained by treating certain runs of successive bin values that are all alike differently from other bin values. Runs of certain length and value that are likely to occur can be classified as special cases and included in the statistical coding procedure, to be accorded short bit length codewords reflective of their tendency to frequently occur. Signals having large run lengths may be converted to relatively short codewords which drastically increase the efficiency of the transmission system.

At the receiver, the coded error signal is decoded and summed with a predicted signal formed from prior decoded error signals, in what is referred to as the inverse DPCM loop. The receiver reconstitutes the coded signal with an inverse process. The predictor delay circuit in the inverse DPCM loop thus stores a prior received decoded signal to be summed to the current received decoded error signal to create the next prediction.

In digital communication systems, for example a DPCM system, a problem recognized by the present invention is one in which interference such as atmospheric conditions or other causes, occasionally cause the transmitted information signal to become garbled or lost. If such loss of data occurs in transmission, the predictor delay circuit of the inverse DPCM loop also loses that data. What happens is that this loop adds the current predicted signal to the current error signal to produce a reconstituted signal, or new prediction. If the current error signal is lost, or corrupted, then that signal when summed with the signal in the predictor delay circuit produces an erroneous reconstituted signal which is applied to the predictor delay circuit to bootstrap the error on a continuous basis. The data signals within the inverse DPCM loop at the receiver thus become corrupted. The present inventors recognize a need for dealing with the problem of lost data in a DPCM system by recovering the data at the receiver in real time without significant observable recurrent video artifacts.

This problem is resolved in a DPCM communication system including a transmitter for transmitting a plurality of frames of a compressed digital encoded information signal over a channel to a receiver. The transmitter includes a DPCM loop which produces an error signal representing the differences between a predicted signal and a current PCM signal having the same spatial position in successive frames. Each frame comprises a plurality of S lines. The receiver includes an inverse DPCM loop for adding a current predicted signal, formed from a prior decoded error information signal, to a current decoded error information signal to produce a reconstituted signal. The signal within the inverse DPCM loop tends to become corrupted upon loss of the current decoded error information signal. The combination therewith comprises refresh means for periodically refreshing selected ones of the lines at the receiver in a given sequence with transmitted PCM data for a plurality of frames over a refresh cycle wherein each scan line of a frame is refreshed.

A feature of the invention comprises means for selecting the lines to be refreshed over a given cycle of L frames such that each data line of a frame is selected once in that given cycle. A further feature of the invention comprises means for generating a number which is effectively quasi-random relative to the time of occurrence of the S lines of each frame. The number generator means includes means for generating a line select signal based on that quasi-randomness such that for L frames of an L frame cycle every line of a frame has been selected.

In the drawing:

FIG. 3 is a block diagram of the refresh generator of the embodiment of FIG. 2; and FIG. 4 is a schematic representation of a display useful for explaining the principles of the present invention.

Figure 1:
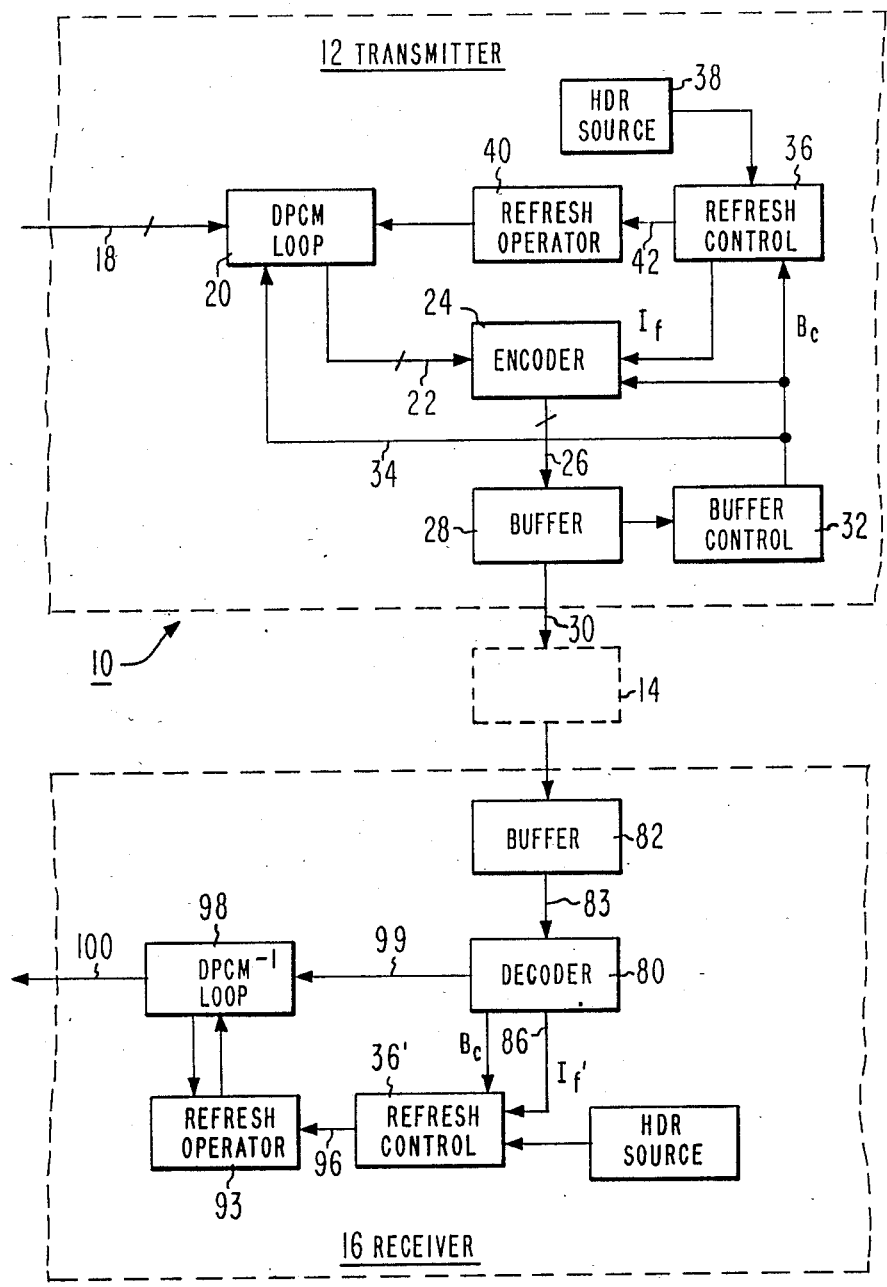
FIG. 1 is a block diagram of a DPCM transmission system employing a refresh system according to one embodiment of the present invention.

In FIG. 1, system 10 comprises a transmitter 12, a channel 14 over which the transmitter 12 transmits and a receiver 16. By way of example, the transmitter 12 and receiver 16 are described as a predictive picture encoder employing differential pulse code modulation (DPCM). However, the signals refreshed by the refresh system of the present invention may be derived from sources other than error signals in a predictive system.

A source of an information signal (not shown), for example a digital video signal, applies the information signal to an analog-to-digital converter (ADC) (not shown) which finely quantizes the information signal in a known way to produce a multilevel digital signal. The output of the analog-to-digital converter (ADC) is applied on conductor 18 as an 8 bit pixel signal to a differential pulse code modulator (DPCM) loop 20. The DPCM loop 20 is one that is generally available and well known. It includes, for example in FIG. 2, subtractor S for subtracting predicted information signals produced by a predictor and delay loop PD from the finely quantized information signal on conductor 18 to produce an error signal on conductor 19. The output of loop PD is applied to subtractor S through switch S1 whose purpose will be explained later. That error signal is applied to a quantizer Q which assigns different values of the input error signal to a reduced number of output values or bins representing zero and non-zero values of the error signal. By way of example, the quantizer Q may have 32 bin values and a zero value, i.e., 32 non-zero values, for a total of 33 different values. The quantizer output values are applied to adder A via DPCM output conductor 22. The conductor 22 is also connected to conductor 19 via switch S2 which selectively bypasses quantizer Q as will also be explained later. When switch S2 is open, switch S1 connects loop PD to conductor 44. When switch S2 is closed, switch S1 applies a reference potential to conductor 44. Adder A adds the quantizer Q output signals to the predictor and delay loop PD output (via switch S1) and applies the added signals to the predictor and delay loop PD. Switch S1 connects the reference potential, e.g., ground, to subtractor S and adder A when switch S2 is closed.

Such a DPCM loop may be, for example, except for switches S1 and S2, as described in U.S. Pat. No. 4,706,260 and in several of the aforementioned copending applications, which describe prior art DPCM loops in greater detail.

It should be understood that wires representing conductors herein represent either single conductors or multiple conductors for transmitting data signals in parallel as known. The input information signal on conductor 18 to DPCM loop 20 may comprise, for example, an 8 conductor cable for carrying an 8 bit signal.

In FIG. 1, the output of the DPCM loop 20 is applied to conductor 22 and may be an 8 bit signal which represents any of the 33 quantized zero and non-zero values of the information signal. The output of the DPCM loop 20 on conductor 22 is applied to encoder 24. The encoder 24 encodes the output values of loop 20 to generate variable length codewords on conductor 26.

Encoder 24 is of a statistical type as discussed in the introductory portion. In particular, the encoding may be according to procedures described by Huffman for encoding variable length codes optimally. Further, encoder 24 may be of the type that encodes both non zero and zero run lengths. One such encoder may be as described in U.S. Pat. No. 4,420,771 issued to Pirsch. In this patent, a coded representation of each run length as well as representation of the non frequent values which make up every other run are combined in a predetermined sequence. Different code tables are used to generate codewords for each type of information. Another system for encoding non zero and zero run length values is disclosed in the aforementioned copending application entitled "Modified Statistical Coding of Digitial Signals". However, other encoders are known for statistically encoding digital signals employing Huffman procedures.

The codewords from encoder 24 are applied via conductor 26 to a buffer 28 sometimes referred to as a rate buffer. The buffer 28 stores the codes for transmission over channel 14 via conductor 30. As known, the buffer 28 tends to overfill and underfill in response to the variable length codewords applied as an input thereto on conductor 26 and has a fixed output rate on conductor 30.

A buffer control 32 senses the fill level of the buffer 28 and applies a control signal $B_c$ on conductor 34 to the DPCM loop 20 for controlling the coarseness of the quantizer Q of the loop 20. The control signal may be a two bit binary value signal representing four possible fill states for causing four different actions. This is described in more detail in the aforementioned U.S. Pat. No. 4,706,260. The quantizer Q (FIG. 2) may increase the number of zeros produced on conductor 22 i.e., widen the coring region, to reduce the data rate applied to buffer 28 in case of overfill. In case of underfill of the buffer, the control 32 applies a signal on conductor 34 to loop 20 to adaptively change the quantizer so as to increase the data rate to the buffer 28. The output of the buffer 28 on conductor 30 is at a constant data rate and information must be maintained on conductor 30 at that constant rate regardless of the rate at which buffer 28 fills. This is generally described in more detail by way of example, in the aforementioned U.S. Pat. No. 4,706,260 and copending application Ser. No. 127,335. Control signal $B_c$ is applied to refresh control 36 and to encoder 24 which encodes signal $B_c$ for transmission to receiver 16.

Refresh control 36 in response to a horizontal drive signal (HDR) from horizontal drive source 38 generates a refresh control signal which is applied to refresh operator 40 via conductor 42. Control 36 also produces a one frame duration initialization signal $I_f$ which internally initializes control 36 to generate PCM for the first transmitted frame and to start refresh after the first transmitted frame. Signal $I_f$ is applied to encoder 24 via conductor 33 for transmission to receiver 16. Source 38 provides a signal which manifests the beginning of each horizontal line in a video raster scan display system whereas $I_f$ manifests the time period of the first frame.

Refresh control 36 is clocked by the HDR signal to periodically generate a refresh control signal. The refresh control signal is initiated by signal $I_f$ and generated in what is effectively quasi-random order relative to the occurrence of the scan lines in successive video frames starting from the time of signal $I_f$. While the refresh control signal, in fact, is generated in fixed periods and is not at all random, it is effective as a random signal relative to the externally related scan line ordinal positions in a frame as will be explained below. The quasi-random order relative to the occurrence of the scan lines is to be differentiated from a pseudo-random order. A pseudo-random order relates to, for example, a pseudo-random number generator which generates what appears to be random numbers based on a complex algorithm and which are independent of external parameters. The effectively quasi-random order referred to herein will be explained in more detail below.

Figure 2:
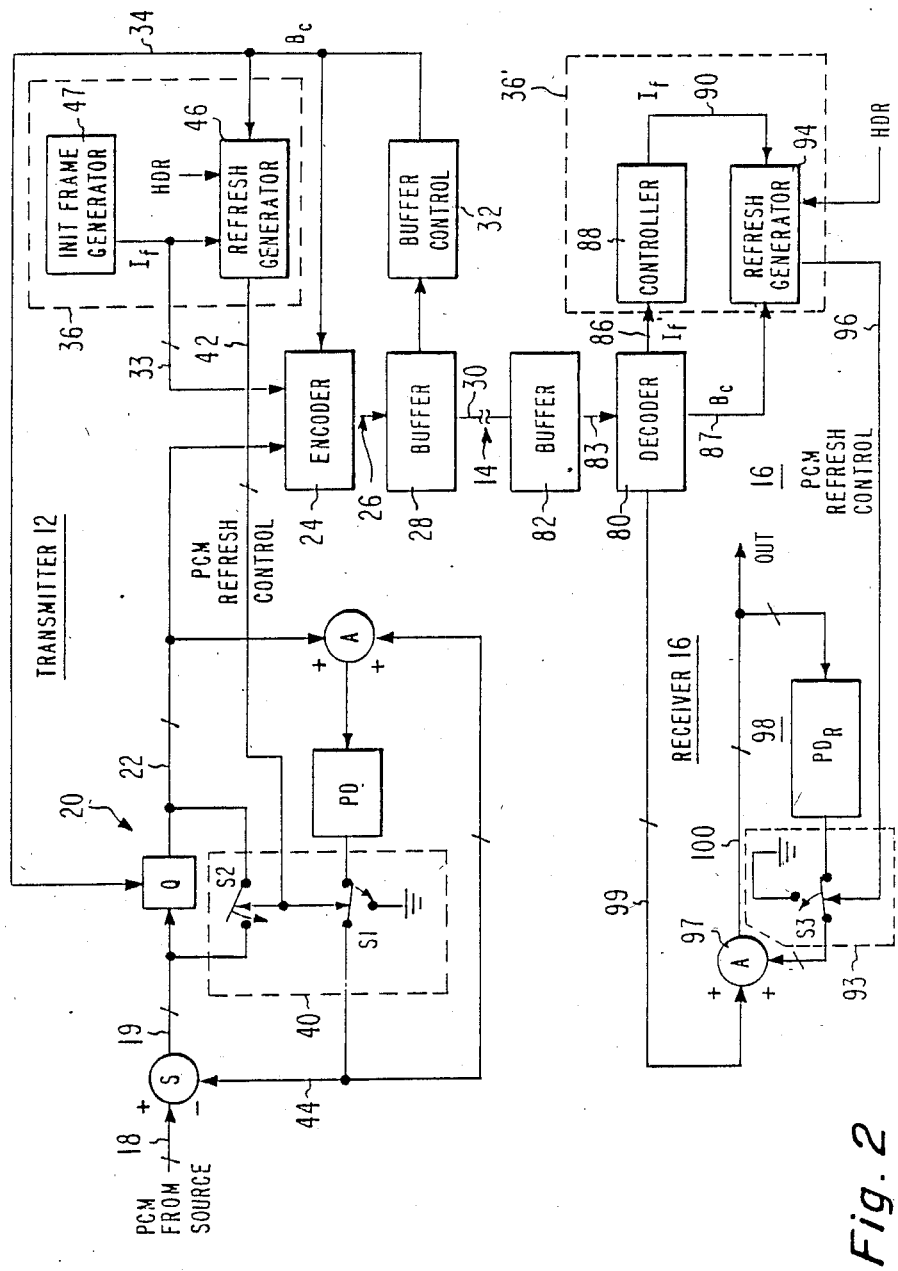
FIG. 2 is a more detailed block diagram of the embodiment of FIG. 1.

Operator 40 includes switches S1 and S2, FIG. 2, represented by mechanical devices which in practice are electronic. When switch S2 is closed by a refresh control signal on conductor 42, the quantizer Q is bypassed. That same refresh control signal simultaneously causes switch S1 to switch states to connect conductor 44 connected between adder A and subtractor S to a reference potential, i.e., ground. This effectively results in subtraction of a zero value signal from the finely quantized video signal on conductor 18. This action produces a PCM data signal on conductor 22. The PCM data signal on conductor 22 is added to the reference potential to effectively load PD with the PCM data rather than summation of the error signal on conductor 22 and the prediction on conductor 44. The switches S1 and S2 in response to a PCM refresh control signal on conductor 42 selectively cause certain selected scan lines of data to be loaded into the PD circuit as PCM data. The determination of which lines are selected is made by refresh control 36. The selection of scan lines, as discussed above, appear to be random relative to the selected scan lines of successive frames.

Refresh control 36, FIG. 2, includes a refresh generator 46 and an initialization signal generator 47. Generator 46 is responsive to the HDR signal, the frame initialization signal $I_f$, and the buffer control signal $B_c$ on conductor 34 from control 32. Generator 47 produces the frame initialization signal $I_f$. Signal $I_f$ has a one frame duration, as shown in FIG. 3. The leading edge of $I_f$ is the sync transition which synchronizes the receiver to the transmitted first frame. During the period signal $I_f$ is low, the generator 46 (and receiver generator 94) is disabled. This causes switches S1 and S2 to be in the PCM load state for one full frame. This ensures a valid DPCM frame for the initial frame. The signal $I_f$ resets generator 46 (and receiver generator 94) so that the generator 46 scan line selection mode starts a scan line count at each generator at the time of occurrence of the leading edge of $I_f$, i.e., upon removal of a low $I_f$ applied to generator 46. The $I_f$ signal is encoded by encoder 24 via conductor 33 and transmitted over channel 14 to receiver 16. The signal $I_f$ at the receiver loads loop $PD_R$ with PCM for that initial frame.

The PCM refresh control signal produced by generator 46 on conductor 42, as mentioned above, operates switches S1 and S2 periodically to effectively cause transmitter 12 to transmit PCM data rather than DPCM data for selected scan lines. That PCM data, after the initial frame, is refresh data for the receiver and is selected only for certain scan lines of a frame as will be described in more detail below. However, the scan lines selected for refresh are such that over a period of X frames, all scan lines of a frame are refreshed. The selected scan lines of the frames constituting the X frames differ from frame to frame so that any scan line is selected only once in the period comprising X frames. The period of X frames is referred to herein as a refresh cycle.

Receiver 16, FIG. 1, includes a rate buffer 82 which receives the transmitted encoded data from channel 14. The encoded data is applied from buffer 82 via conductor 83 to decoder 80. Decoder 80 applies the decoded information data to inverse differential pulse code modulation ($DPCM^{-1}$) loop 98 via conductor 99. The output of loop 98 is applied via conductor 100 to post processing circuit (not shown) for display and utilization. Decoder 80 decodes the frame initialization signal $I_f$ and applies the decoded $I_f$ signal to the receiver refresh control 36' via conductor 86. The decoded $I_f$ signal which is expanded by control 36 to one frame duration initializes control 36' which in certain respects is identical to control 36. The resetting of control 36' synchronizes the generation of its PCM refresh control signals for each refresh cycle to the generation of the PCM signals produced by control 36. The PCM refresh control signal of control 36' is produced on conductor 96 for control of refresh operator 93. Operator 93 in response to the refresh control signal on conductor 96 (and to the $I_f$ signal) causes inverse DPCM loop 98 to pass the received PCM data on conductor 99 directly to loop 98 output conductor 100. All of this will become clearer below upon more detailed explanation of controls 36 and 36'.

In FIG. 2, receiver 16, decoder 80 decodes the $I_f$ signal codeword to produce a frame initialization pulse $I_f'$. This pulse is applied to controller 88 which expands the pulse into signal $I_f$ of one frame length in duration. Signal $I_f$ disables refresh generator 94 for the initial frame and then resets the generator at the end of that frame. Generator 94 generates a PCM refresh control signal on conductor 96 for causing switch S3 to connect a reference potential, e.g., ground, to the adder 97 input when the generator is disabled for the initial frame and for subsequent scan lines to be refreshed. Initially this action loads PCM data in the inverse DPCM loop for that first frame. Otherwise, switch S3 normally connects the $PD_R$ output to the adder 97. Switch S3 thus connects the output of the receiver predictor delay ($PD_R$) or a reference potential, e.g., ground, to adder 97, in accordance with the switch state. A second input of adder 97 is received from decoder 80 via conductor 99. Decoder 80 decodes the information video signal and applies the decoded information signal to conductor 99. The adder 97 output conductor 100 applies the added signals to $PD_R$. $PD_R$'switch S3 and adder 97 form an inverse DPCM loop 98. The initialization signal $I_f$ from controller 88 synchronizes generator 94 so that the same scan lines of the transmitted frame following the initial PCM frame and selected by generator 46 for refresh are also selected by generator 94. Otherwise, generators 46 and 94 are asynchronously operated relative to each other via the locally generated horizontal drive signals.

An assumption is made that once the generators 46 and 94 are started in synchronization, their free running identical operation in response to the locally generated HDR signals will maintain the desired timing. Thus, for example, if transmitter generator 46 selects for refresh scan lines $X_1$, $X_2$ and $X_3$ of the first frame, lines $X_4$, $X_5$ and $X_6$ of the second frame and so on, generator 94 of the receiver will also select lines $X_1$, $X_2$ and $X_3$ of the first frame, lines $X_4$, $X_5$ and $X_6$ of the second frame and so on.

The term refresh herein means that straightforward PCM data is transmitted directly to the receiver without quantization and without encoding. When the encode 24 receives direct PCM data from subtractor S, encoder 24 is bypassed and PCM data is passed directly to buffer 28. The PCM data includes data codes that indicate to the encoder 24 that PCM data is being applied and is not to be encoded. How to do this is within the skill of those of ordinary skill in this art.

However, PCM data which is not encoded includes a relatively large number of data bits as compared to encoded data based on statistical coding. If the buffer 28 is full or filling too fast, then control 32 senses this fill status and sends control signal $B_c$ to generator 46 to slow the PCM generation process selecting fewer lines per frame or temporarily halting the generation of PCM data since an overfilled buffer is more serious an event than the delay of refreshing the receiver scan lines. The aforementioned U.S. Pat. No. 4,706,260 discloses one embodiment of control 32. The signal $B_c$ is decoded by decoder 80 which applies the decoded $B_c$ signal to refresh control 36' generator 94. This causes generator 94 to select the same number of scan lines for a refresh cycle. The same lines will be selected at the transmitter and receiver for the same successive frames of a given refresh cycle. At the end of that frame, a new number of scan lines in the next refresh cycle is set in accordance with the value of $B_c$.

FIG. 3 illustrates one embodiment of refresh generator 46 (and generator 94). Generator 46 includes a refresh number switch set 48 whose output is a binary number applied through conductors $50_a$—$50_n$ to a divide by N down counter, 54. Each of the conductors $50_a$—$50_n$ carries a signal having a binary value to produce a binary number of a given fixed value. The switches in switch set 48 may comprise electronic devices which, for example, couple conductors $50_a$—$50_n$ to either a positive voltage or to ground. The switches may be electronic devices which are controlled by a setable control signal. The switches in set 48 are also responsive to the rate buffer fill status signal $B_c$ on input conductor 34. The signal $B_c$ may be clocked from a register (not shown) by a vertical sync signal which occurs at the beginning of each frame. This ensures the number in set 48 does not change except at the beginning of a frame. The switches of set 48 are reset to different states to increase or decrease the value of the binary number represented by the signal values on conductors $50_a$—$50_n$ as needed to control the rate of fill of buffer 28 (FIG. 1), based on the value of signal $B_c$. The rate buffer fill status signal $B_c$ is a signal produced by buffer control 32. The buffer control 32 is described in detail in the aforementioned U.S. Pat. No. 4,706,260 and need not be described in more detail herein. The purpose of changing the number produced by the switch set 48 in response to the rate buffer fill status signal on conductor 34 is to change the rate at which refresh data is generated to therefore modify the rate data is applied to the buffer 28 FIG. 2. All of this will become clearer following the explanation of the refresh generator 46. In a similar context, the received decoded signal $B_c$ is applied to the switch set of generator 94 control 36' in the receiver.

Generator 46 includes a divide by N down counter 54. Counter 54 is a parallel load unit which receives simultaneously all of the binary values from conductors $50_a$—$50_n$. Numbers are loaded into the counter 54 upon receipt of an HDR clock pulse whenever the load input is low. A low load input can occur if either the $I_f$ signal or the counter 54 RCO output is low. The counter 54 output at the RCO conductor 56 switches from a low to a high upon receipt of that HDR pulse immediately after the number from the switch set 48 is loaded into the counter. Each subsequent horizontal drive signal pulse (HDR) decrements the counter by one. After N decrements, the count goes to zero and the RCO output goes low. This low is transferred to the load input via AND gate 58, thus reinitiating the cycle. AND gate 58 serves as an OR gate for low level input signals. The low on conductor 56 also passes to conductor 42 via AND gate 58. A low on conductor 42 is the PCM refresh control signal that causes switch S1 to connect ground to conductor 44 and closes switch S2 (FIG. 2). The counter 54 is synchronous and performs the counting operation upon the receipt of a clock pulse at its clock input. The number produced by the switch set 48 has a binary value N. When the divide by N countdown is finished, i.e., the count goes to zero internally, the counter ripple carryout output (RCO) immediately goes low. In effect, the occurrence of the low output on the RCO output occurs on the Mth (N+1) count. The first clock pulse of the M count produced by the HDR signal merely loads the number N into the counter. Subsequent clock pulses decrement the counter resulting in an HDR clock pulse count of N+1. The pulse used to load the counter has to be included in the count since each HDR clock pulse represents a scan line. Upon the application of the zero value signal by the RCO output to conductor 56, the counter is reset so that the counter will reload the binary number from the switch set 48 upon the next received HDR clock signal. A second input to gate 58 is the first frame initialization signal $I_f$ discussed above. The value of M is unique as it is determined relative to the number of scan lines in a given frame.

The video signal on conductor 18 (FIG. 1) comprises a series of video frames A, B, C and so forth as illustrated in FIG. 4. Each frame is illustrated as comprising ten scan lines for simplicity of illustration. In practice, a given video frame may comprise 525 scan lines. Successive frames, for example, frames A, B and C each have the same number of scan lines. A succession of frames contains a sequence of contiguous scan lines each line occurring in a given time period of a frame as determined by the HDR signal. The number of scan lines in a given frame in practice, of course, could be different than the 525 scan lines presently in use in video transmission systems.

The value of N as produced by the switch set 48 is determined so that M does not have any factors in common with the total number of scan lines, S, in a given frame. For example, assume frame A, as all of the frames of FIG. 4, has ten scan lines. The allowable values of M are numbers which do not have common factors with the number 10. That is, M cannot have a value that is either 2 or 5, or multiples of 2 or 5. In practice, in a 525 scan line system, M cannot have a value of 3, 5 and 7, or integer multiples of those numbers, the factors of 525. While M generally can have any other number, it is preferred that M has a certain value which does not produce artifacts in the visible image as will be explained.

In the representation of FIG. 4, M is illustrated as having a value of 7. Upon the occurrence of the HDR signal for each successive seventh scan line, generator 46 generates a PCM refresh control signal which selects that scan line to be refreshed. For example, in FIG. 4, scan line 60 is the Mth line in the video frame A, in this case, the seventh line. The next scan line which is the seventh scan line from scan line 60 is scan line 62. Scan line 62, however, is the fourth scan line in frame B. The next scan line which is M scan lines in time from line 62 is line 64. Line 64, however, is the first line of frame C. The next Mth scan line is line 66 which is the eighth scan line of frame C. Further, the next scan line, assuming M remains a constant, is scan line 68 of frame D. This scan line is the fifth scan line. Over the ensuing frames (not shown) the scan lines which will be refreshed are: the second, ninth, sixth, third and tenth. At this point, all lines have been refreshed and the cycle repeats. The refresh cycle thus encompasses seven frames. It can be shown that the refresh cycle always comprises M frames.

This process of selecting the Mth scan line from the previous scan line for refresh purposes is automatically continued for all video frames. The number M is such that the selected refreshed scan lines in successive frames are not spatially close (i.e., adjacent) to one another to preclude the production of an artifact such as window shading. This artifact gives the appearance that the refresh lines are scrolling vertically (up or down) in the video displayed image. For example, if the first scan line of frame A were to be refreshed, this would produce a video image somewhat different than the DPCM image of adjacent scan lines based on error signals. If the second scan line of frame B were selected for refreshing and the third scan line of frame C and the fourth line of frame D and so on, the refreshed scan lines of adjacent frames would visably appear to be moving vertically in the video image. That motion would appear to a normal viewer as a scrolling line and is objectionable. It can be shown that the value of M can be easily determined by one of ordinary skill in the art.

In the present embodiment it can be shown that N can be conveniently set so as to make M a power of 2, for example, N may have a value 15, 31, 63 and 127 in a 525 scan line frame. These numbers are such that the corresponding refresh cycles have respectively 16, 32, 64 and 128 values. These values of M are generally convenient approximately 1, 2, 4 or 8 second intervals in a 15 frame per second system, or κ, 1, 2 and 4 seconds in a 30 frame per second system. Binary numbers are convenient to use and their selection does not add complexity to the transmission system.

In the alternative, a pseudo-random number generator could be used to generate a refresh control signal in which a number is generated which is pseudorandom independently of the occurrence of the scan lines in a frame. Such randomness is relative to the generator as well as to the scan lines but has the drawback of requiring correlation between the transmitter and receiver. It is a relatively complex problem to synchronize a receiver with a transmitter using a pseudo-random generator at each site because of the complex algorithms in the generators used to generate the random numbers. Such number generation must be identical at the receiver and transmitter to properly function. In the present system, it is a simple matter for constructing a refresh generator 46 which is easily synchronized at the receiver and transmitter. All that needs to be done is set the value of N to the same number in the refresh generator switch sets in the receiver and transmitter. This greatly simplifies the correlation problem between the two ends of the transmission system which are otherwise asynchronous. Further, generators 46 and 94 each include means (not shown) responsive to a locally generated vertical sync signal for permitting the generators to complete the line selection process for the prior frame then in progress. By way of example, a register (not shown), FIG. 3, latches signal $B_c$ into set 48 only in response to a vertical sync signal. This is done also in the receiver generator 94 similarly.

As mentioned above, in FIG. 3, a rate buffer fill status signal $B_c$ is applied on conductor 34 to the switch set 48. Assuming, for example, that the rate buffer is overfilling, the rate buffer fill status signal on conductor 34 indicates this overfill condition. PCM data in a refresh signal produces data at a much higher rate than quantized data which tends to compress the video information signal. It is desirable to expand in duration the cycle of the refresh scan lines as much as possible to avoid overfilling the rate buffer at an increased rate due to the PCM generated data. The overfill signal $B_c$ on conductor 34 causes the switch set 48 to increase the value of the selected number N. For example, the number N normally may be set at 15 but if the rate buffer fill status is indicating overfill, the number may be set at 127 or 255 or even larger numbers. The larger the number, the fewer the number of refreshed scan lines in each frame and the larger the number of frames in a refresh cycle. The number of frames in a refresh cycle, that is, where every line of a frame is eventually refreshed, can be large, for example, 1K or more frames. This implies M is 1K for this situation.

Assume that the rate buffer is underfilling, then it is desirable to add more data. In this case, the signal $B_c$ on conductor 34 sets the switch set 48 to a smaller number. This decreases the number of frames in a given refresh cycle so that more lines are refreshed in each frame of the cycle. By placing a refresh generator in both the receiver and the transmitter, additional transmission overhead is reduced.

What is claimed is:

1. In a DPCM communication system including a transmitter for transmitting a plurality of frames of a compressed digital encoded information signal over a channel to a receiver, the transmitter including a DPCM loop which produces an error signal representing the differences between a predicted signal and a current PCM signal having the same spatial position in successive frames, each frame comprising a plurality of S lines, said receiver including an inverse DPCM loop for adding a current predicted signal, formed from a prior decoded error information signal, to a current decoded error information signal to produce a reconstituted signal, the signal in the inverse DPCM loop tending to become corrupted upon loss of said current decoded error information signal, the combination therewith comprising:

refresh means for periodically refreshing selected ones of said lines at the receiver in a given sequence with transmitted PCM data for a plurality of frames over a refresh cycle wherein in each cycle each scan line of a frame is refreshed.

2. The system of claim 1 wherein said system includes refresh means at the receiver and transmitter for refreshing the same selected lines in said inverse DPCM loop and DPCM loop and synchronizing means for synchronizing the selection of said lines at said receiver to the selection of lines at the transmitter.

3. The system of claim 2 wherein said means for synchronizing includes initialization means for initializing the refresh means at the receiver and the refresh means at the transmitter to the same initial selected frame.

4. In a DPCM communication system including a transmitter for transmitting a plurality of frames of a compressed digital encoded information signal over a channel to a receiver, the transmitter including a DPCM loop for producing an error signal representing the differences between a predicted signal and a current PCM signal having the same spatial position in successive frames, said receiver including an inverse DPCM loop for adding a current predicted signal formed from a prior decoded error information signal to a current decoded error information signal to produce a reconstituted signal, the signal within the inverse DPCM loop tending to become corrupted upon loss of said current decoded error information signal, a system for refreshing said inverse DPCM loop with unencoded data comprising:
first and second means respectively at the receiver and at the transmitter for periodically selecting different portions of said plurality of frames to be refreshed with said unencoded data, the same portion being selected at the transmitter and receiver for a given PCM data;
operator means responsive to said means for periodically selecting for loading said DPCM and inverse DPCM loops with said unencoded PCM data to thereby erase from said inverse loop erroneous decoded data which might otherwise be present; and
means for synchronizing said first and second means.

5. The system of claim 4 wherein each said frame comprises a plurality of S scan lines of equal duration, said first and second means for selecting each including means for selecting scan lines of different spatial position in adjacent successive frames.

6. The system of claim 4 wherein said means for periodically selecting includes means for counting successive scan lines of each said frame and for generating a line select signal every Mth line where M does not have factors in common with S, said operator means including means responsive to said line select signal for refreshing that line represented by said line select signal.

7. The system of claim 4 wherein said means for synchronizing includes means for transmitting a frame initialization signal manifesting the first frame to be transmitted, said first and second means for periodically selecting at the transmitter and receiver each including means responsive to said initialization signal applied thereto for commencing said periodical selecting.

8. In a system for generating an information signal representating a plurality of contiguous frames of data, each frame containing S lines of data, each said lines of data occurring in certain time periods, means for selecting one line at a time over a given cycle of L frames such that each line of a fram is selected once in that given cycle, said line selecting means comprising:
means for generating a timing signal representing the time of occurrence of each said line; and
number generator means responsive to said timing signal applied as an input thereto for generating a number which is related to the time of occurrence of each said S lines for a given frame such that selected lines in adjacent frames have different spatial positions, said number generator means including means for generating a line select signal for every Mth line of said contiguous frames where M is an integer having a fixed value that does not share common factors of S whereby for L frames of an L frame cycle, every line is selected.

9. The line select means of claim 8 wherein said number generator includes switch means for generating a binary signal having a value N and binary number count means responsive to said binary signal and to said timing signal for counting the value of N in a count means cycle to generate said line select signal at the end of a count cycle and for automatically recounting the value of N of said binary signal at the end of each count cycle.

10. The line selecting means of claim 8 wherein said generator means includes means for generating a count signal having a value N and a divide by N counter responsive to said count signal for counting the value N of said count signal and for generating said line select signal upon completion of the divide by N count cycle.

11. The line selecting means of claim 10 wherein said counter has a load input for setting the count to the number N, and feedback means for applying said select signal to said load input for automatically resetting the count to the number N after each divide by N count cycle.

12. In a DPCM communication system including means for transmitting an encoded information signal to a receiver, said signal representing a raster display comprising a plurality of successively occurring frames, each frame of a like plurality of S scan lines, said transmitting tending to cause errors in said signal which errors adversely affect the received signal, a refresh system for periodically transmitting an unencoded information signal portion tending to overcome said adverse affect, said information signal portion corresponding to at least one scan line of a frame raster; said refresh system comprising:
refresh operating means for causing said means for transmitting to generate said unencoded information signal portion in response to a refresh control signal applied thereto, and
control means for periodically generating said refresh control signal for causing said refresh operating means to periodically refresh selected scan lines.

13. The refresh system of claim 12 wherein said control means includes means for selecting every Mth scan line of said successively occurring frames where M is an integer having a fixed value that has no factors in common with S whereby for L frames of a refresh cycle every scan line is refreshed.

14. The refresh system of claim 12 wherein said DPCM system includes means for generating an error signal representing the difference between a current received information signal and a predicted information signal, said operating means including means responsive to said control signal for nullifying said predicted signal so that said current signal is unchanged, said control means including means for generating said refresh control signal in time periods corresponding to every successive Mth scan line.

15. The refresh system of claim 12 wherein said control means includes generating means for generating a number having a value corresponding to M and count means responsive to said generated number for counting the value of said generated number, said count means generating said control signal upon the occurrence of the Mth count, said count means including means responsive to said control signal applied thereto for cyclically resetting the count thereof.

16. The refresh system of claim 15 wherein said number generating means includes switch means for generating a number signal having a value N, said count means comprising means responsive to said number signal applied thereto for dividing the value of said number signal by N where the value of M of said control signal is N+1.

17. In a DPCM communication system including means for generating an error signal representing the difference between an information signal and a predicted information signal and for transmitting an encoded error information signal to a receiver, said signal representing a raster display comprising a plurality of successively occurring frames, each frame of a like plurality of S scan lines, said transmitting tending to cause errors in said signal which errors adversely affect the received signal, a refresh system for periodically transmitting an unencoded information signal portion tending to overcome said adverse affect, said information signal portion corresponding to at least one scan line of a frame raster, said refresh system comprising:

switch means responsive to an applied control signal and connected to said DPCM system for selectively nulling said error signal to cause said system to transmit said unencoded information signal; and means responsive to a horizontal line drive signal representing the beginning of each said scan line for generating said control signal to selectively operate said switch means on selected ones of said scan lines such that the selected lines relative to a given frame of lines is sufficiently spatially different from the selected lines of successive frames to substantially avoid generating artifacts in the received information signal, said selected lines being spaced in time from frame to successive frame a time interval value such that the number of lines corresponding to the time spacing of said selected lines is a predetermined function wherein all lines of a frame are selected over a refresh cycle comprising a plurality of frames.

18. The refresh system of claim 17 wherein said means for generating said control signal includes means for generating a number signal having a value representing a fixed number of lines corresponding to a given time interval value and count means for cyclically counting said lines to generate said control signal upon the count of said fixed number value.

19. The refresh system of claim 17 wherein said communication system includes a transmitter and a receiver, said system including separate switch means and separate control signal generating means respectively operationally connected to said transmitter and to said receiver.

20. In a DPCM communication system including a transmitter for transmitting a plurality of frames of a compressed digital encoded information signa over a channel to a receiver, the transmitter including a DPCM loop for producing an error signal representing the differences between a prior signal and a current PCM signal, control signal generating means for generating a rate buffer fill status signal indicating the fill status of a rate buffer in the transmitter, said receiver including an inverse DPCM loop for adding a prior decoded information signal to a current decoded information signal to produce a reconstituted signal, said inverse DPCM loop tending to become corrupted upon loss of said current decoded information signal, a system for periodically refreshing said inverse DPCM loop with unencoded data comprising:

means for periodically selecting different portions of said plurality of frames at the receiver and transmitter to be refreshed with said unencoded data including means responsive to said fill status signal for selecting the number of said portions selected in a given time period in accordance with said buffer fill status; and means responsive to said means for periodically selecting for loading said DPCM and inverse DPCM loops with said unencoded PCM data to thereby erase from said inverse loop erroneous decoded data which might otherwise be present.

21. The system of claim 20 wherein said means for selecting including means for selecting scan lines of different spatial position in adjacent successive frames.

22. The system of claim 20 wherein said means for periodically selecting includes means for counting successive scan lines of each said frame and for generating a line select signal every Mth line where M has no factors in common with S, said refresh means including means responsive to said line select signal for refreshing that line represented by said line select signal, said means for generating a line select signal including means responsive to said fill status signal for changing the value of M in a direction tending to stabilize the fill of said buffer.

* * * * *